United States Patent
Tabata

(10) Patent No.: US 6,183,389 B1
(45) Date of Patent: Feb. 6, 2001

(54) CONTROL SYSTEM FOR LOCK-UP CLUTCH

(75) Inventor: Atsushi Tabata, Okazaki (JP)

(73) Assignee: Toyota Jidosha Kabushiki Kaisha, Toyota (JP)

(*) Notice: Under 35 U.S.C. 154(b), the term of this patent shall be extended for 0 days.

(21) Appl. No.: 09/435,769

(22) Filed: Nov. 8, 1999

(30) Foreign Application Priority Data

Nov. 9, 1998 (JP) .................................................. 10-317738

(51) Int. Cl.$^7$ ............................. B60K 41/02; F16H 61/14
(52) U.S. Cl. ................................. 477/5; 477/62; 477/63; 477/174
(58) Field of Search .......................... 477/5, 6, 62, 63, 477/168, 174, 180

(56) References Cited

U.S. PATENT DOCUMENTS

| | | | |
|---|---|---|---|
| 5,415,603 | * | 5/1995 | Tuzuki et al. .......................... 477/5 |
| 5,562,565 | * | 10/1996 | Moroto et al. .......................... 477/8 |
| 5,735,770 | * | 4/1998 | Omote et al. .......................... 477/5 |
| 5,775,449 | * | 7/1998 | Moroto et al. .......................... 477/5 |
| 5,789,823 | * | 8/1998 | Sherman .............................. 475/5 |
| 5,856,709 | * | 1/1999 | Ibaraki et al. ........................ 290/45 |
| 5,895,333 | * | 4/1999 | Morisawa et al. .................... 477/7 |
| 6,070,680 | * | 6/2000 | Oyama .............................. 180/65.2 |
| 6,081,042 | * | 6/2000 | Tabata et al. ......................... 475/5 |

FOREIGN PATENT DOCUMENTS

| | | |
|---|---|---|
| 8-168104 | 6/1996 | (JP) . |
| 9-324666 | 12/1997 | (JP) . |

* cited by examiner

*Primary Examiner*—Sherry Estremsky
(74) *Attorney, Agent, or Firm*—Oliff & Berridge, PLC

(57) ABSTRACT

In a vehicle provided with an engine and a motor as interchangeable drive sources, a torque converter attached to the vehicle transmission is controlled so as to capitalize upon the advantages of the motor when the motor is used as the drive source. A map to be used in determining whether to engage the lock-up clutch is selected according to whether the drive source is the engine, the engine plus motor generator, or motor generator (steps 100, 110, 120).

14 Claims, 17 Drawing Sheets

FIG. 4

|   | C0 | C1 | C2 | B0 | B1 | B2 | B3 | B4 | F0 | F1 | F2 |
|---|----|----|----|----|----|----|----|----|----|----|----|
| P | ○  |    |    |    |    |    |    |    |    |    |    |
| R (STOPPED) | ○ |   |   |   |   |   |   |   | ○ |   |   |
| R (RUNNING) |   |   | ○ | ○ |   |   |   |   | ○ |   |   |
| N | ○ |   |   |   |   |   |   |   |   |   |   |
| D L 1st | ○ | ○ |   |   |   |   |   |   | ○ |   | ○ |
| D 2 2nd | △ | ○ |   |   | △ |   |   |   | ○ | ○ |   |
| D 3 3rd | ○ | ○ | ○ |   |   |   |   |   | ○ |   |   |
| D 4 4th | ○ | ○ | ○ |   |   | ○ |   | △ | ○ |   |   |
| D 4 5th |   | ○ | ○ | ○ |   | ⊗ |   |   | ○ |   |   |
|         |   | ○ | ○ | ○ |   | ⊗ |   |   |   |   |   |

○ ENGAGED    △ ENGAGED AT THE TIME OF ENGINE BRAKING    ⊗ ENGAGED, BUT IRRELEVANT TO DRIVING FORCE TRANSMISSION

70b REAR SIDE
70a FRONT SIDE

CONTROL SYSTEM FOR LOCK-UP CLUTCH

BACKGROUND OF THE INVENTION

1. Field of Invention

This invention relates to a lock-up control system for a torque transmission device with a lock-up clutch that is arranged between a drive source and a drive wheel of a vehicle that has at least a motor or a motor generator in its drive source.

2. Description of Related Art

In a vehicle that has an engine, fuel is combusted within the engine, generating heat energy, and this heat energy is converted to mechanical energy (drive force) to drive the vehicle. With an engine, the driving region at which combustion efficiency is good and high torque can be obtained is limited to a relatively narrow r.p.m. (revolution per minute) range. Therefore, in a vehicle that uses an engine as the drive source, the engine r.p.m. and engine output torque are changed by a transmission depending on a driving condition, and transmitted to the vehicle wheel(s).

Incidentally, in recent years, hybrid vehicles have been proposed that have a different type of drive source, in particular, a motor generator, with objects of conserving the fuel which drives the engine, reducing the noise due to engine revolution, and reducing the exhaust gas that is generated through combustion of the fuel. It is proposed, in these hybrid vehicles, too, to use a transmission and a torque converter with a lock-up clutch between the drive source and the drive wheel(s), the same as in a vehicle that has only an engine as a drive source. For example, there is such a system disclosed in Japanese Laid-Open Application No. 8-168104.

Incidentally, a hybrid vehicle provided with a motor or motor generator as described above can run using the motor or motor generator as a drive source, and since this motor or motor generator has the advantage of having virtually no torque fluctuation as compared to an engine that combusts fuel, it is possible to control the lock-up clutch of a torque converter so as to capitalize on this advantage. However, in existing systems, including the one listed above, lock-up clutch control that adequately capitalizes on the advantage of a motor or motor generator is not necessarily always performed.

SUMMARY OF THE INVENTION

This invention is made in light of the above-described problems, and has an object of, in a vehicle that has at least a motor in its drive source, capitalizing on the advantages of the motor the state in which a torque transmission system (torque converter) with a lock-up clutch that is positioned between a drive source and a drive wheel is operated with the motor as the drive source.

In order to solve the above-described problems, in a first aspect of the invention, a vehicle is provided with an engine, which is driven through fuel combustion, and a motor as drive sources, and has a torque transmission device with a lock-up clutch that is provided between a drive wheel on one side and the engine and motor on the other side. A lock-up clutch control device is provided that controls an engagement state of the lock-up clutch. The lock-up clutch control device changes the content of the engagement control of the lock-up clutch according to the operational state of the drive source.

Additionally, in a second aspect of the invention, in an operational state in which the motor operates as the drive source, the driving region at which the lock-up clutch is engaged is broadened compared to an operational state in which only the engine operates as the drive source.

Additionally, in a third aspect of the invention, in an operational state in which only the motor operates as the drive source, the driving region at which the lock-up clutch is engaged is broadened compared to an operational state in which the engine and motor both operate as drive sources.

Thus, in the first through third aspects of the invention, since the motor is comparatively less apt to generate torque fluctuation than the engine, the vehicle can be driven with the lock-up clutch engaged. In other words, the advantage of the motor can be capitalized upon, i.e., the fact that at a given acceleration and vehicle speed, even if the lock-up clutch cannot be engaged due to torque fluctuation when driving by the engine only, the lock-up clutch can be engaged when operating the motor as a drive source.

In a fourth aspect of the invention, a vehicle is provided with an engine that operates through fuel combustion and a motor as drive sources, and a torque transmission device with a lock-up clutch is provided between a drive wheel on one side and the engine and motor on the other side. A transmission is also provided. A lock-up clutch control device is provided that controls an engagement state of the lock-up clutch. The lock-up clutch control device changes the content of the lock-up clutch engagement control according to an operational state of the drive source at the time of speed changing by the transmission.

Additionally, in a fourth aspect of the invention, the lock-up clutch control device controls the lock-up clutch to be in a half-engaged state in an operational state in which the motor is operating as the drive source at the time of speed changing by the transmission. The lock-up clutch control device controls the lock-up clutch to be in a disengaged state in an operational state in which only the engine is operating as the drive source at the time of speed changing.

Thus, according to the fourth and fifth aspects of the invention, the advantage of the motor can be capitalized upon, i.e., the fact that when the lock-up clutch is engaged and the vehicle is driven by only the engine, speed changing of the transmission, in other words, switching of the various engaging elements in the transmission, must be performed after temporarily disengaging the lock-up clutch, but when operating the motor as a drive source, since the torque variation is small, it is unnecessary to completely disengage the lock-up clutch.

In a sixth aspect of the invention, a vehicle is provided with at least a motor generator as a drive source, and a torque transmission device with a lock-up clutch provided between a drive wheel and the motor generator. The motor generator can supply regenerative braking torque to the drive wheel by functioning as an electrical generator. A lock-up clutch control device is provided that controls an engagement state of the lock-up clutch. During deceleration of the vehicle, the motor generator functions as an electrical generator during deceleration of the vehicle, and the lock-up clutch control device controls an engagement state of the lock-up clutch in order to adjust the deceleration degree during deceleration.

According to the sixth aspect of the invention, regenerative braking torque is applied to a drive wheel by the motor generator during deceleration of the vehicle. It is necessary to change the magnitude of the regenerative braking torque in order to achieve the desired deceleration degree of the vehicle. By appropriately adjusting the engagement state of the lock-up clutch and changing the r.p.m. of the motor generator, the magnitude of the regenerative braking torque can be changed.

BRIEF DESCRIPTION OF THE DRAWINGS

FIG. 4 is a chart showing operational states of a frictional engaging device for setting various transmission levels of the gear transmission device shown in FIG. 3;

FIG. 8(A) is a map that shows the case in which only the engine operates as the drive source, FIG. 8(B) is a map that shows the case in which the engine and the motor generator operate as the drive source, and FIG. 8(C) is a map that shows the case in which only the motor generator operates as the drive source;

DETAILED DESCRIPTION OF PREFERRED EMBODIMENTS

Figure 2:
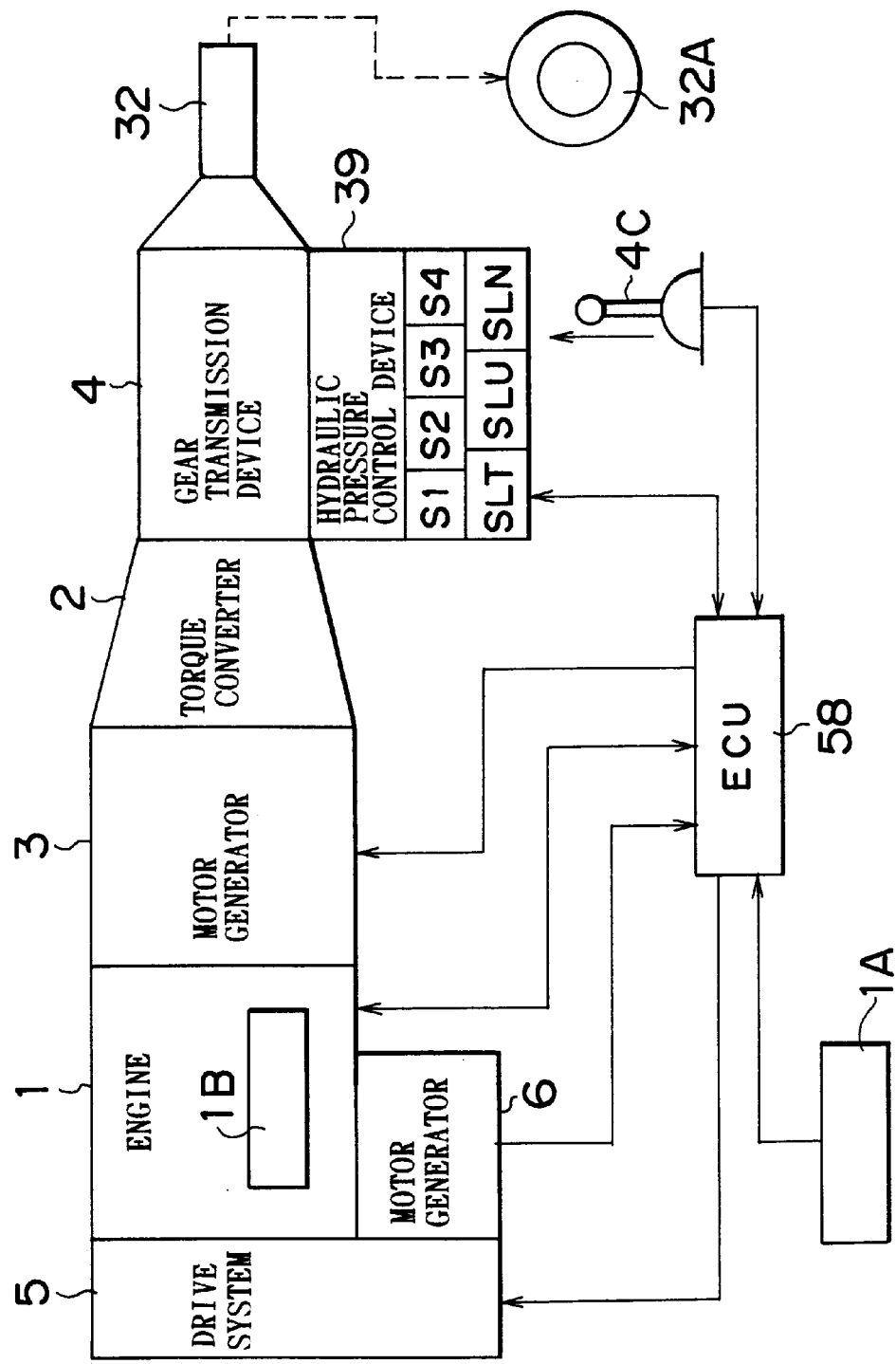
FIG. 2 is a block diagram that shows a system structure of a hybrid vehicle in which this invention is incorporated.

Next, this invention will be more specifically described with reference to the drawings. FIG. 2 is a diagram that shows the system structure of a hybrid vehicle in which this invention is applied. For the engine 1, which is a drive source of the vehicle, an internal combustion engine is used, such as a gasoline engine, a diesel engine, an LPG engine, a gas turbine engine or the like. The engine 1 of this embodiment has a conventional structure with a fuel injection system, an intake and exhaust system, an ignition system and/or the like.

Additionally, an electronic throttle valve 1B is provided in an air intake port of the engine 1, and the structure is such that the degree of opening of the electronic throttle valve 1B is electrically controlled. A motor generator 3 is arranged between the engine 1 and a torque converter 2, and the torque converter 2 is connected to an input side of a gear transmission device 4. This engine 1, motor generator 3, torque converter 2 and gear transmission device 4 are arranged in line. Furthermore, another motor generator 6 is disposed on another path of transmission of the torque that is output by the engine 1, via a drive means 5 including a chain, sprocket and/or the like. The motor generators 3 and 6 may, for example, be AC synchronized motor generators.

Figure 3:
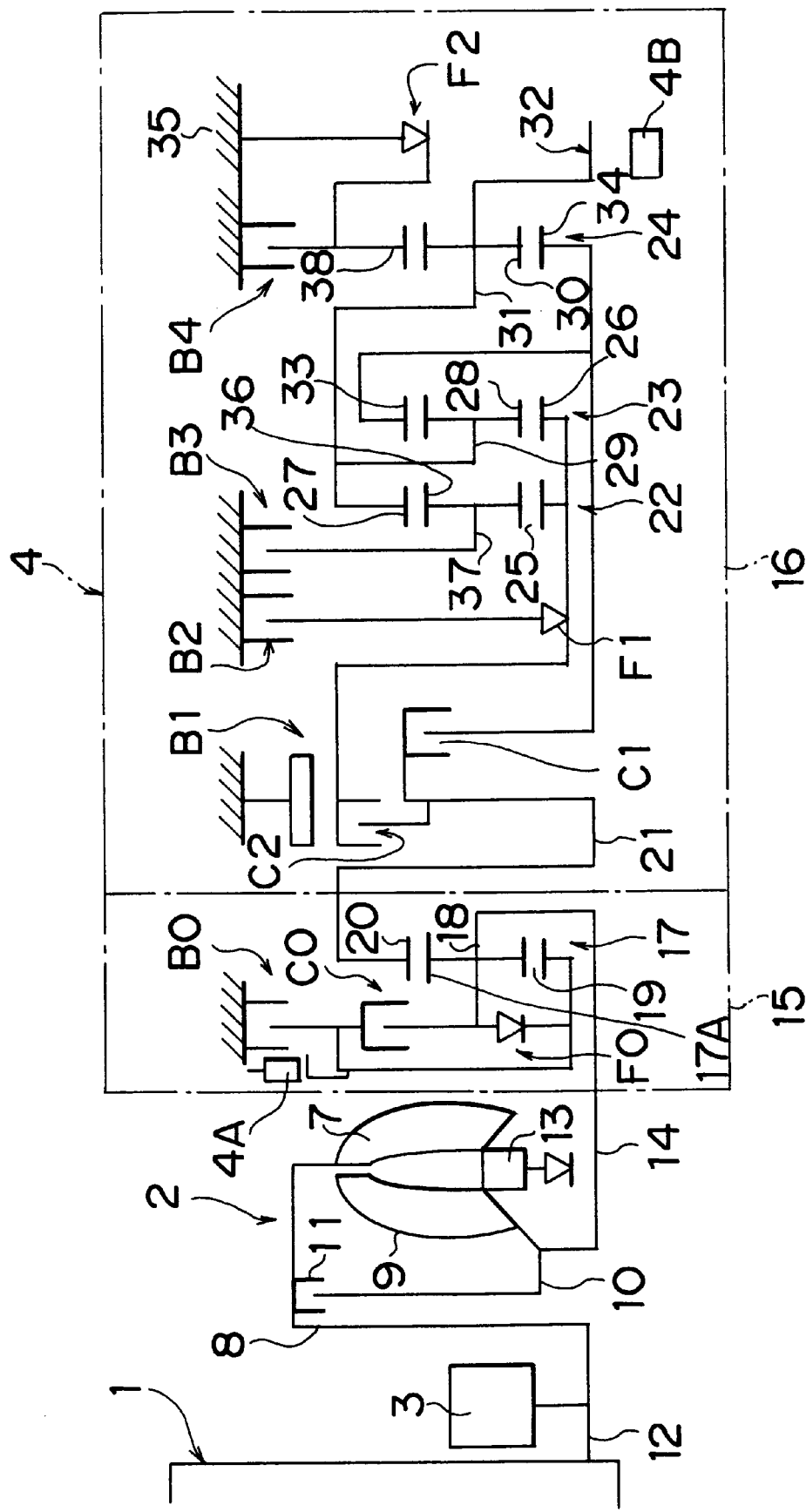
FIG. 3 is a skeleton diagram that shows a structure of the gear transmission device and torque converter shown in FIG. 2.

First, the structure on one torque transmission path will be described in detail. FIG. 3 is a skeleton diagram of the structure of the torque converter 2 and the gear transmission device 4. Automatic transmission fluid is used as operating fluid, and is poured into the casing that houses the torque converter 2 and the gear transmission device 4.

The torque converter 2 transmits the torque of the drive side component to the receiving side component via a fluid medium. This torque converter 2 has a front cover 8 that is made integral with a pump impeller 7, a hub 10 integrally attached to a turbine runner 9, an a lock-up clutch 11. The torque of the pump impeller 7 is transmitted to the turbine runner 9 by a fluid medium. The lock-up clutch 11, which is commonly known, is for selectively engaging/disengaging the front cover 8 and the hub 10. Furthermore, it is also possible to perform slip control that causes the lock-up clutch 11 to slip at a specified engaging pressure.

The front cover 8 is coupled to a crank shaft 12 of the engine 1. Output torque of the motor generator 3 can be input to the front cover 8, and output torque of the engine 1 can be input to a rotary shaft (not shown) of the engine 1. Additionally, a stator 13 is provided at the inner peripheral side of the pump impeller 7 and the turbine runner 9. This stator 13 is for amplifying the torque that is transmitted from the pump impeller 7 to the turbine runner 9. Furthermore, an input shaft 14 of the gear transmission device 4 is connected to the hub 10. Therefore, when torque is output from the crank shaft 12 of the engine 1, this torque is transmitted to the input shaft 14 of the gear transmission device 4 via the torque converter 2 or the lock-up clutch 11. Additionally, it is also possible to perform control that inputs the torque of the engine 1 to the motor generator 3, and to perform control that transmits the torque of the motor generator 3 to the crank shaft 12.

The above-mentioned gear transmission device 4 is constituted by a secondary transmission component 15 and a primary transmission component 16. The secondary transmission component 15 is provided with a planetary gear mechanism 17 for an overdrive. An input shaft 14 is coupled to a carrier 18 of the planetary gear mechanism 17. A multi-plate clutch CO and a one-way clutch FO are provided between the carrier 18 and the sun gear 19 that form the planetary gear mechanism 17. The one-way clutch FO engages upon positive rotation of the sun gear 19 relative to the carrier 18, or in other words, when the sun gear 19 rotates in the direction of rotation of the input shaft 14. A ring gear 20, which is an output element of the secondary transmission component 15, is connected to an intermediate shaft 21, which is an input element of the primary transmission component 16. Additionally, a multi-plate brake BO is provided that selectively stops the rotation of the sun gear 19.

Therefore, in the secondary transmission component 15, when the multi-plate clutch CO or the one-way clutch FO is engaged, the planetary gear mechanism 17 rotates as a single unit. Therefore, the intermediate shaft 21 rotates at the same speed as the input shaft 14, resulting in a low speed level. When the brake BO is engaged and the rotation of the sun gear 19 is stopped, the ring gear 20 is rotated at an amplified speed with respect to the input shaft 14, resulting in a high speed level.

Meanwhile, the primary transmission component 16 is provided with three planetary gear mechanisms 22, 23 and 24. The rotary elements that form the three planetary gear 22, 23 and 24 are coupled as described below. Namely, a sun gear 25 of the first planetary gear mechanism 22 and a sun gear 26 of the second planetary gear mechanism 23 are integrally coupled together. Additionally, a ring gear 27 of the first planetary gear mechanism 22, a carrier 29 of the second planetary gear mechanism 23, and a carrier 31 of the third planetary gear mechanism 24 are coupled together. Furthermore, an output shaft 32 is coupled to the carrier 31. This output shaft 32 is connected to a vehicle wheel 32A via a torque transmission system (not shown). Furthermore, a ring gear 33 of the second planetary gear mechanism 23 is coupled to a sun gear 34 of the third planetary gear mechanism 24.

In a gear train of the primary transmission component 16, one reverse speed and four forward speeds can be set. Frictional engaging systems, in other words a clutch and brake, for setting these speeds are provided as described below. First, the clutch will be described. A first clutch C1 is provided between the ring gear 33 and sun gear 34 on one side and the intermediate shaft 21 on the other side. Additionally, a second clutch C2 is provided between the mutually coupled sun gear 25 and sun gear 26 on one side and the intermediate shaft 21 on the other side.

Next, the brake will be described. A first brake B1 is a band brake, and is disposed so as to stop rotation of the sun gear 25 of the first planetary gear mechanism 22 and the sun gear 26 of the second planetary gear mechanism 23. A first one-way clutch F1 and a second brake B2, which is a multi-plate brake, are disposed in line between the sun gears 25 and 26 and the casing 35. The first one-way clutch F1 engages upon reverse rotation of the sun gears 25 and 26, or in other words, when the sun gears 25 and 26 try to rotate in a direction opposite the direction of rotation of the input shaft 14.

Additionally, a third brake B3, which is a multi-plate brake, is provided between the carrier 37 of the first planetary gear mechanism 22 and casing 35. The third planetary gear mechanism 24 is provided with a ring gear 38. A fourth brake B4, which is a one-way brake, and a second one-way clutch F2 are provided as a brake that stops rotation of the ring gear 28. The fourth brake B4 and the second one-way clutch F2 are arranged in parallel between the casing 35 and the ring gear 38. The second one-way clutch F2 is structured so as to engage when the ring gear 38 tries to rotate in reverse. Furthermore, an input r.p.m. sensor (turbine r.p.m. sensor) 4A that detects the input r.p.m. of the gear transmission device 4 is provided, as well as an output r.p.m. sensor (vehicle speed sensor) 4B that detects the r.p.m of the output shaft 32 of the gear transmission device 4.

In the gear transmission device 4 structured as described above, five forward speeds and one reverse speed can be set by engaging/disengaging the frictional engaging system of each clutch and brake as shown in the operation/engagement table of FIG. 4. In FIG. 4, a "O" shows that the frictional engaging system is engaged, and "Δ" shows that the frictional engaging system is engaged at the time of engine braking, and a "ⓧ" shows that the frictional engaging system may either be engaged or disengaged, or in other words, that even if the frictional engaging system is engaged, it is unrelated to transmission of torque. An empty box shows that the frictional engaging system is disengaged.

Figure 5:
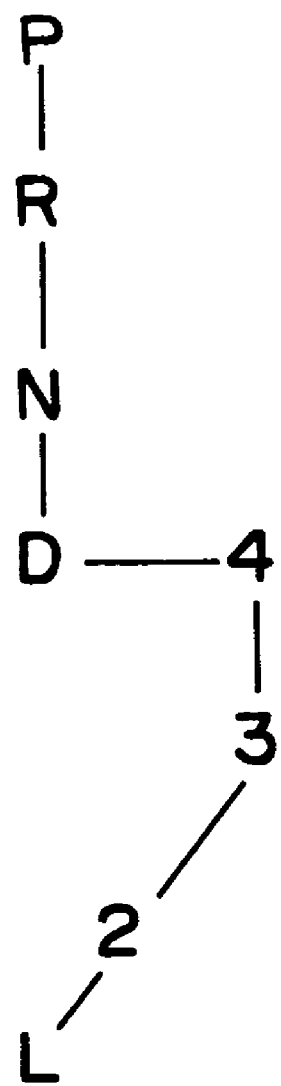
FIG. 5 is a diagram that shows shift positions of a shift lever that manually operates the gear transmission device shown in FIG. 2.

Additionally, in this embodiment, through manual operation of a shift lever 4C, various shift lever positions can be set as shown in FIG. 5. Namely, a P (parking) position, an R (reverse) position, an N (neutral) position, a D (drive) position, a 4 position, a 3 position, a 2 position, and an L (low) position can be set. The D position, the 4 position, the 3 position, the 2 position and the L position are forward positions. When the D position, the 4 position, the 3 position and the 2 position are set, it is possible to change between a plurality of speeds. In contrast, when the L position, or the R position, which is the reverse position, is set, a single speed is fixed.

Through a hydraulic control system 39, shown in FIG. 2, setting or switching control of the speeds in the gear transmission device 4, engagement/disengage or slip control of the lock-up clutch 11, line pressure control of the hydraulic circuit, control of the engagement pressure and the frictional engaging system(s), and/or the like are performed. The hydraulic control system 39 is electrically controlled, and is provided with first through third shift solenoid valves S1–S3 for executing speed changing of the gear transmission device 4, and a fourth solenoid valve S4 for controlling an engine braking condition.

Furthermore, the hydraulic control system 39 is provided with a linear solenoid valve SLT for controlling line pressure of the hydraulic circuit, a linear solenoid valve SLN for controlling back pressure during speed transition of the gear transmission device 4, and a linear solenoid valve SLU for controlling engagement pressure of the lock-up clutch 11 or a specified frictional engaging system.

Figure 6:
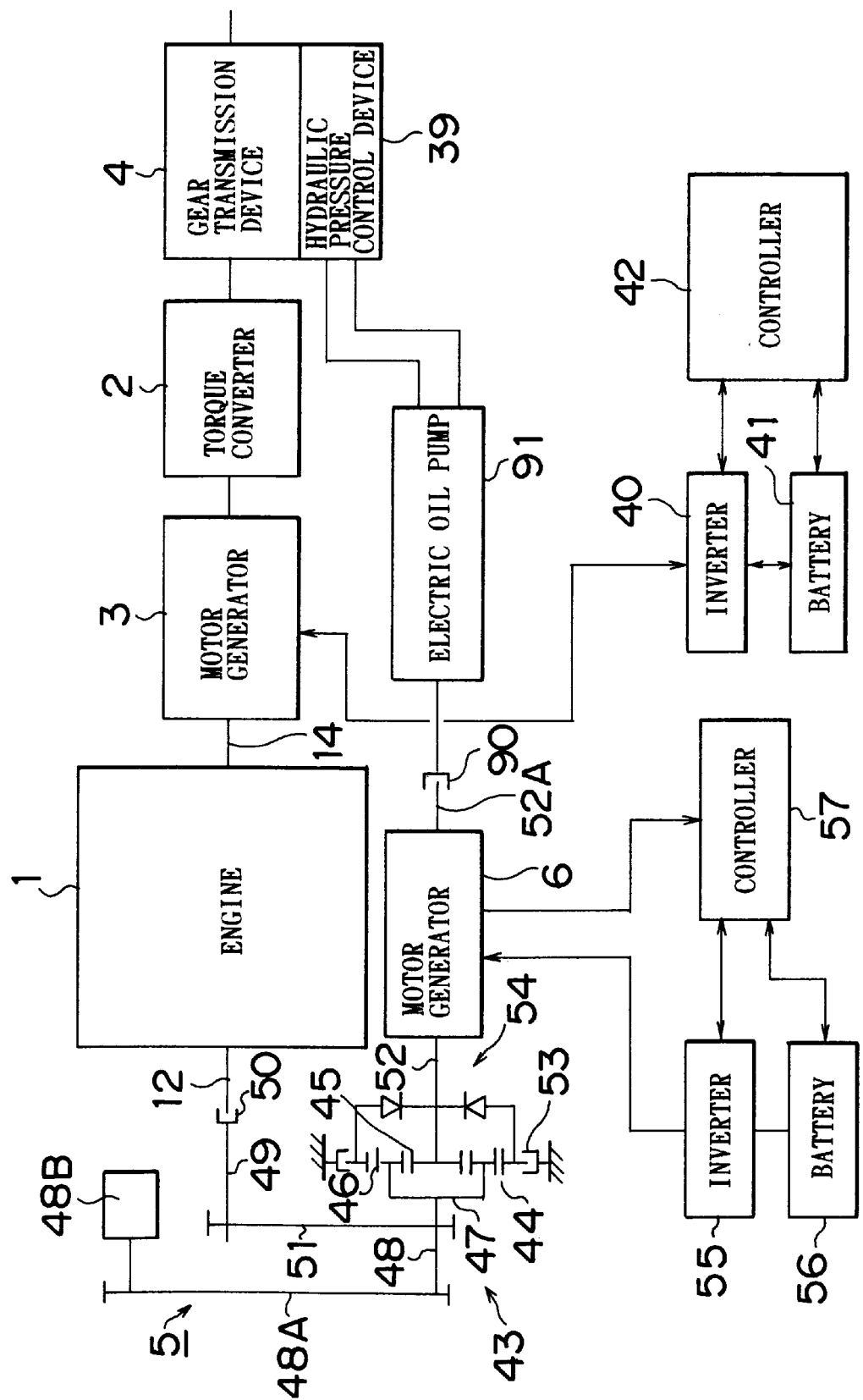
FIG. 6 is a block diagram that shows the relationship between the motor generators 3 and 6 shown in FIG. 2 and other hardware structures.

FIG. 6 is a block diagram that shows the control system of the motor generators 3 and 6. The motor generator 3 is connected to the input shaft 14. The motor generator 3 is provided with a rotation generating function that converts mechanical energy to electrical energy, and a function that converts electrical energy to mechanical energy. In other words, the motor generator can function both as an electrical generator and as an electric motor.

In other words, the motor generator 3 can generate electricity from the torque input from the crank shaft 12, and can store the electrical energy in a battery 41 via an inverter 40. Additionally, torque output from the motor generator 3 can be transmitted to the crank shaft 12, and can supplement the torque output from the engine 1. Furthermore, a controller 42 is connected to the inverter 40 and the battery 41. This controller 42 has a function of detecting an electric current value provided to the motor generator 3, and of detecting an electric current value generated by the motor generator 3. Additionally, the controller 42 has a function of controlling the r.p.m of the motor generator 3, a function of detecting and controlling a state of charge (SOC) of battery 41, and a function of detecting a failure state and/or temperature of the motor generator 3.

Next, the operation of the motor generator 6 will be described. The drive system 5 is provided with a speed reducing system 43. This speed reducing system 43 is connected to the engine 1 and to the motor generator 6. The speed reducing system 43 is provided with a coaxially arranged ring gear 44 and sun gear 45, and a plurality of pinion gears 46 that mesh with the ring gear 44 and the sun gear 45. The plurality of pinion gears 46 are held by a carrier 47, and a rotary shaft 48 is coupled to the carrier 47. Additionally, a rotary shaft 49 is provided coaxially with the crank shaft 12 of the engine 1, and a clutch 50 is provided that connects/isolates the rotary shaft 49 and the crank shaft 12. A chain 51 is provided between the rotary shaft 49 and the rotary shaft 48 to relatively transmit torque. Furthermore, an auxiliary system 48B such as an air compressor or the like is connected to the rotary shaft 48 via a chain 48A.

Additionally, the motor generator 6 is provided with a rotary shaft 52, and the above-mentioned sun gear 45 is attached to the rotary shaft 52. Additionally, a brake 53 is provided in the housing 35 to stop rotation of the ring gear 44. Furthermore, a one-way clutch 54 is disposed at the periphery of the rotary shaft 52, and an inner shaft of the one-way clutch 54 is coupled to the rotary shaft 52. An outer shaft of the one-way clutch 54 is coupled to the ring gear 44. Through the speed reducing system 43 with the above-described structure, torque transmission or speed reduction is carried out between the engine 1 and the motor generator 6. Furthermore, the one-way clutch 54 engages when torque output from the engine 1 is transmitted to the motor generator 6.

The above-described motor generator 6 is provided with a rotation generating function that converts mechanical energy to electrical energy, and with a force-exerting function that converts electrical energy to mechanical energy. In other words, the motor generator 6 can function both as an electric generator and as an electric motor. Specifically, the motor generator 6 has a function as a starter that starts the engine 1, a function as an electric generator (alternator), and a function of driving an auxiliary system 48B when the engine 1 is stopped.

When the motor generator 6 functions as a starter, the clutch 50 and the brake 53 are engaged, and the one-way clutch 54 is disengaged. When motor generator 6 functions as an alternator, the clutch 50 and the one-way clutch 54 are engaged, and the brake 53 is disengaged. Furthermore, when the auxiliary system 48B is driven by the motor generator 6, brake 53 is engaged, and the clutch 50 and the one-way clutch 54 are disengaged.

In other words, it is possible to input torque that has been output from the engine 1 to the motor generator 6 and generate electricity, and to store this electrical energy in the battery 56 via an inverter 55. Additionally, it is possible to transmit torque output from the motor generator 6 to the engine 1 or the auxiliary system 48B. Furthermore, a controller 57 is connected to the inverter 55 and the battery 56. This controller 57 has a function of detecting and/or controlling an electric current value supplied by the motor generator 6, and/or an electric current value generated by the motor generator 6. Additionally, the controller 57 is provided with a function that controls the r.p.m of the motor generator 6, and a function that detects and controls the state of charge (SOC) of the battery 56.

Additionally, an electric oil pump 91 is coupled via a clutch 90 to a rotary shaft 52A that is on a side of the motor generator 6 opposite to the side where the rotary shaft 52 is located. This is because, when driving by the motor generator 3 without operating the engine 1, an oil pump (not shown) within the gear transmission device 4 ceases to operate, and the supply source of hydraulic pressure that operates the various elements within the gear transmission device 4 disappears.

Figure 7:
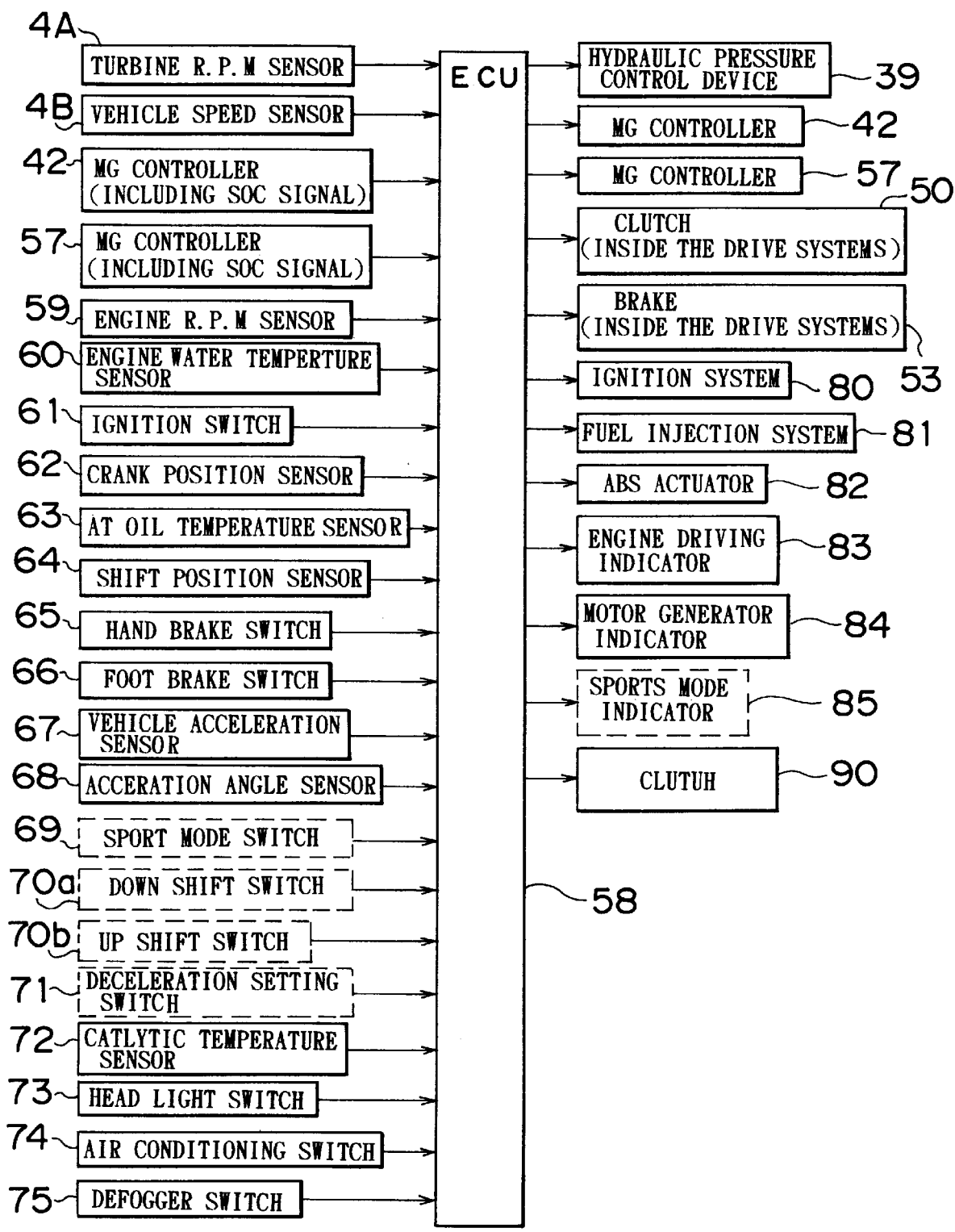
FIG. 7 is a diagram that shows signals that are input to and output from an ECU 58.

FIG. 7 is a block diagram that shows a control circuit of the system shown in FIGS. 2 and 6. An electronic control unit (ECU) 58 is constituted by a microcomputer that has a central processing unit (CPU), a storage unit (RAM, ROM) and an input/output interface as main components.

The following signals and/or the like are input to the electronic control unit 58: a signal from the turbine r.p.m. sensor 4A of the torque converter 2, a signal from the vehicle speed sensor 4B, signals from MG controllers 42 and 57 that include signals that show the state of charge (SOC) of the batteries 41 and 56, a signal from an engine r.p.m. sensor 59, a signal from an engine water temperature sensor 60, a signal from a ignition switch 61, a signal from a crank position sensor 62 that detects a rotary position of the crank shaft 12, a signal from an oil temperature sensor 63 that detects the temperature of automatic transmission fluid, a signal from a shift position sensor 64 that detects the operating position of the shift lever 4C, a signal from a side brake switch 65 that detects an intention of the driver to stop the vehicle, a signal from a foot brake switch 66 that detects an intention of the driver to slow the vehicle or hold the speed of the vehicle, a signal from a vehicle acceleration sensor 67, a signal from an acceleration degree sensor 68 that shows the amount by which an accelerator pedal 1A is depressed, a signal from a catalytic temperature sensor 72 provided in an exhaust pipe (not shown), and signals from a headlight switch 73, an air conditioning switch 74, and a defogger switch 75 and/or the like.

The following signals are output from the electronic control unit 58: a signal that controls the hydraulic pressure control device 39 of the gear transmission device 4 in the automatic transmission, signals that control MG controllers 42 and 57, signals that control the clutch 50 and the brake 53 of the drive system 5 of the motor generator 6, a signal that controls an ignition system 80 of the engine 1, a signal that controls a fuel injection system 81 of the engine 1, a signal that controls ABS actuator 82 that stops the vehicle when the engine is automatically stopped, a control signal to an indicator 83 that shows that the engine 1 is running, a control signal to an indicator 84 that shows that the motor generator 3 is running, a control signal to a clutch 90 that controls transmission of driving torque of the motor generator 6 to the electric oil pump 91, and/or the like.

In this manner, based on the various signals input to the electronic control unit 58, the operation of the engine 1, the operation of the motor generators 3 and 6 and the operation of the gear transmission device 4 are controlled. Specifically, control of starting/stopping and/or output of the engine 1 is carried out based on the signal from the shift position sensor 64, the signal from the ignition switch 61, the signal from the acceleration degree sensor 68, the signal showing the amount of charging of the batteries 41 and 56 by the motor generators 3 and 6, and/or the like.

Herein, the content of the control by the electronic control unit 58 of the gear transmission device 4, the hydraulic pressure control device 39 and the lock-up clutch 11 will be specifically described. An acceleration map that controls the acceleration ratio of the gear transmission device 4 is stored in the electronic control unit 58. In this acceleration map, running condition of the vehicle, for example acceleration degree and vehicle speed, are taken as parameters, and acceleration points for up-shifting or down-shifting from a specified transmission speed to another transmission speed are set.

An acceleration evaluation is carried out based on this acceleration map, and when the acceleration evaluation is established, a control signal is output from the electronic control unit 58 and this control signal is input to the hydraulic pressure control device 39. As a result, a specified solenoid valve(s) is operated, the hydraulic pressure in a specified frictional engaging system is changed, engaging/disengaging of the frictional engaging system is carried out, and a change in speed is thereby implemented. Here, the engine torque is mapped using the degree of throttle opening and the engine r.p.m. as parameters, and this map is stored in the electronic control unit 58. The engaging/disengaging timing of the frictional engaging system that implements the speed change, and the hydraulic pressure used in the frictional engaging system, are controlled based on the engine torque. In this manner, a so-called multistage type automatic transmission is structured by the gear transmission device 4 and the hydraulic pressure control device 39.

The above-described lock-up clutch 11 is controlled based on the acceleration degree, the vehicle speed, the transmission speed and/or the like. For this purpose, a lock-up clutch control map that controls the operation of the lock-up clutch 11 is stored in the electronic control unit 58.

In this lock-up clutch control map, an engaging and/or disengaging region of the lock-up clutch 11, or a region of slip control (interim state), are set with the acceleration degree of vehicle speed as parameters. In this embodiment, this lock-up clutch control map has three types of settings according to the drive source operational states related to this invention, namely, the operational state in which only the engine 1 operates as the drive source, the operational state in which the engine 1 and the motor generator 3 operate, and the operational state in which only the motor generator 3 operates.

Figure 8A:
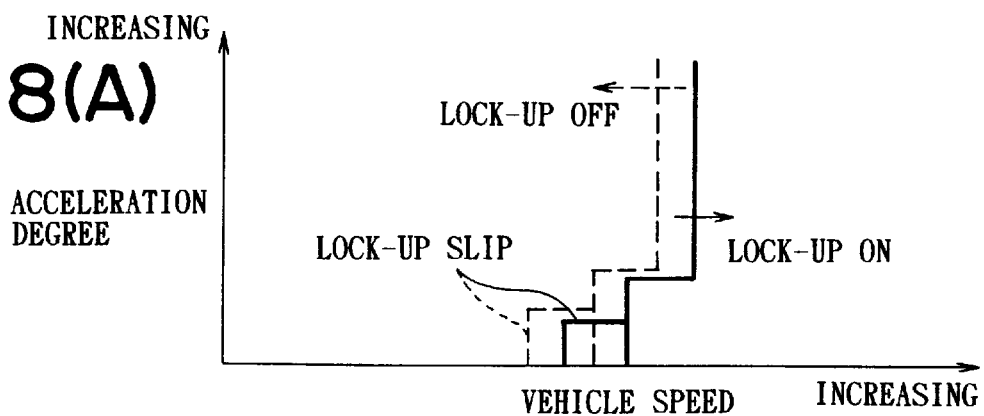
FIGS. 8(A)–8(C) are maps that show engagement control of the lock-up clutch at each drive source operational state. Specifically.
Figure 8B:
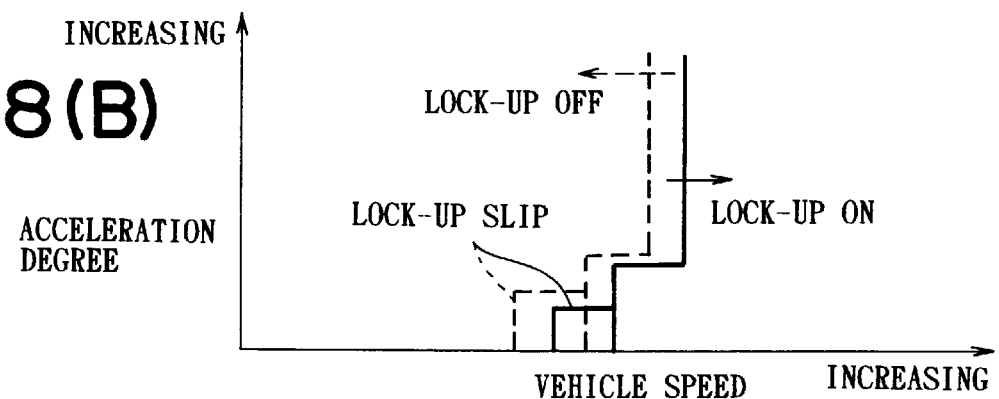
Figure 8C:
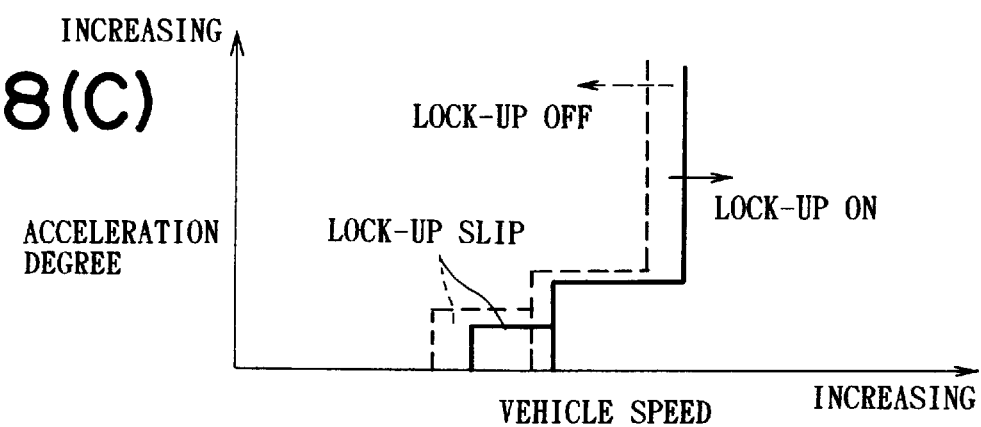

These operational states are shown in FIG. 8. FIG. 8(A) shows the case in which the engine 1 is used as the drive source. FIG. 8(B) shows the case in which the engine 1 and the motor generator 3 are used as the drive source. FIG. 8(C) shows the case in which the motor generator 3 is used as the drive source. Thus, when at least the motor generator 3 is used as a drive source, the region at which the lock-up clutch 11 is engaged is broadened on the low speed side.

In each figure, the solid line shows that the lock-up clutch 11 is switched from ON to OFF. The dashed line shows that the lock-up clutch 11 is switched from OFF to ON. The reason for providing this hysteresis is to prevent hunting.

Control content of the above-described hybrid vehicle will be described. When the ignition switch is turned on, the motor generator 6 operates and the electric oil pump operates. Through the operation of the oil pump, hydraulic pressure of the control fluid and the gear transmission device 4 is increased, thus making it possible to perform hydraulic control of the gear transmission device 4. Meanwhile, the torque of the motor generator 6 is transmitted to the engine 1 via deceleration system 43, and the engine 1 starts. There are cases where it is not necessary for the engine 1 to start at this time, and in these cases, the clutch 50 is turned OFF and the engine 1 does not start even though the motor generator 6 does start.

When the shift lever 4C is moved to a forward position (for example, the D position), a forward clutch C1 in the gear transmission device 4 engages through the hydraulic pressure control device 39 (see FIG. 4), and the torque of the engine 1 and/or motor generator 3 can be transmitted to the drive wheel(s). In this state, when the accelerator pedal 1A is depressed, the torque of the motor generator 3 increases and is transmitted to the drive wheel(s) via the torque converter 2 and the gear transmission device 4, and the vehicle moves forward. In a condition in which the efficiency of the engine 1 is low, such as when starting to move or at low-speed driving, fuel is not injected into the engine 1, and therefore the engine 1 is placed in an inoperational state and the vehicle runs by only the motor generator 3. However, it is not necessarily the case that the engine 1 is always inoperational at the time of starting to move forward. Under specified conditions (for example, when the charge amount of the battery is low) the engine 1 may operate even at the time when the vehicle starts to move or the like.

The torque necessary to run the vehicle is determined based on the acceleration degree and the vehicle speed. The engine r.p.m. is determined based on an optimum combustion curve that is pre-stored in the electronic control unit 58. Furthermore, in addition to controlling the amount by which the electronic throttle valve 1B is opened, the r.p.m. of the motor generator 3 is determined based on the speed changing ratio of the gear transmission device 4, and the engine r.p.m. is controlled. Simultaneously, with respect to the necessary drive force, the torque that must be generated by the motor generator 3 is determined.

When decelerating or holding the speed of the vehicle, the torque input from the wheel 32A is transmitted to the crank shaft 12 via the gear transmission device 4 and the torque converter 2. When this happens, the motor generator 3 functions as an electric generator by the torque from the wheel, and the generated electrical energy is stored in the battery 41. The batteries 41 and 56 are controlled so that their amount of charge falls within a specified range. When the amount of charge diminishes, the engine output is increased, and a portion of the engine output is transmitted to the motor generator 3 or the motor generator 6, causing it to generate electricity. When the vehicle stops, the engine 1 is automatically stopped.

When the hybrid vehicle is running, when a change in the engine torque occurs during changing of the speed of the gear transmission device 4 or during slip control of the lock-up clutch 11, the torque of the motor generator 3 is controlled according to this change of the engine torque.

Control of a torque converter of a hybrid vehicle that has the above-described hardware structure corresponding to claims 1–10 will be described below.

Figure 1:
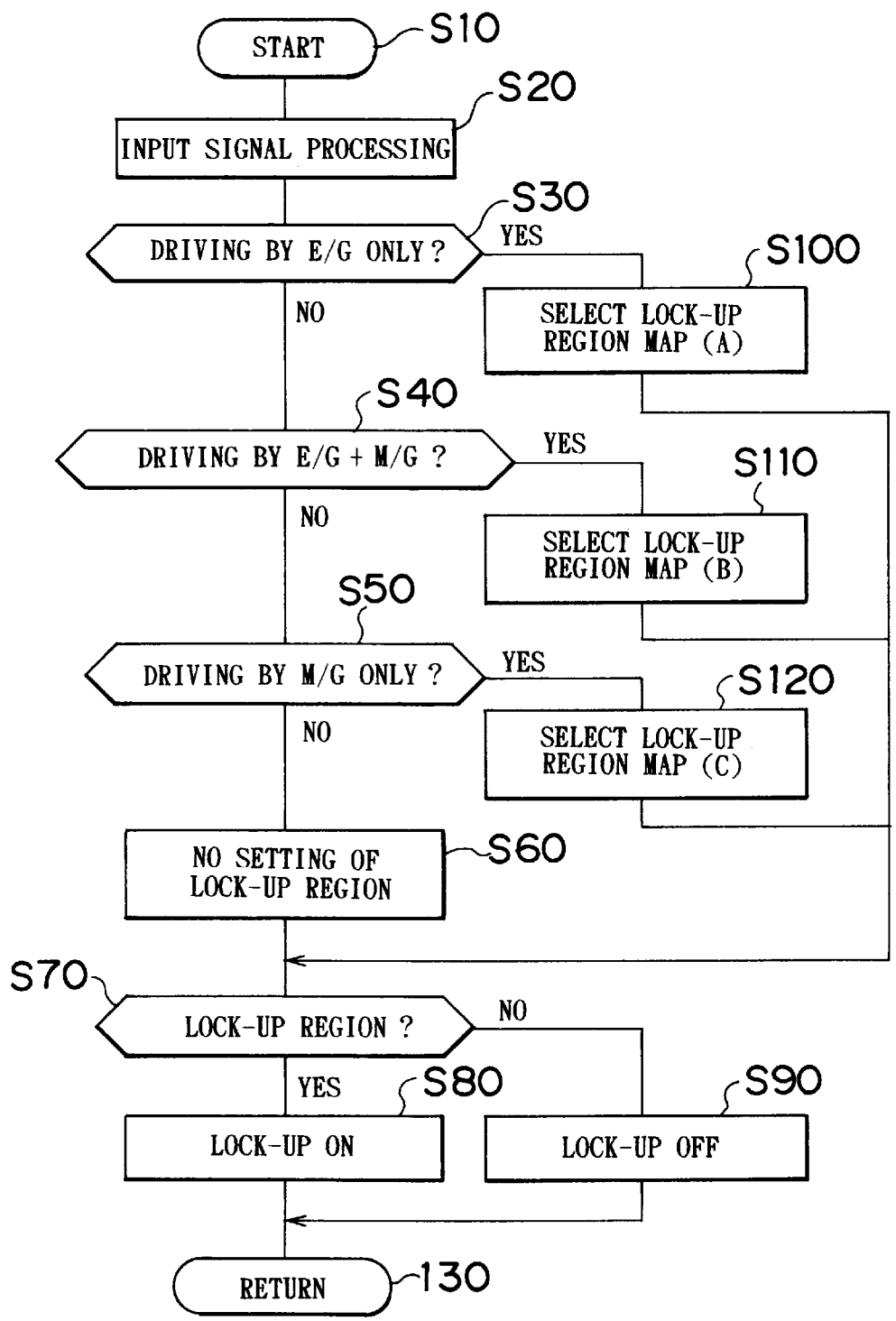
FIG. 1 is a flowchart of control in a first embodiment of this invention.

First, control will be described for a first embodiment of the invention, corresponding to claims 1 and 2. FIG. 1 is a flowchart of control in the first embodiment. In the flowchart of FIG. 1, first, in step 20, input processing of various detected signals is performed. In step 30, it is determined whether the drive source is just the engine 1. If "YES" is determined in step 30, control proceeds to step 100, determines that the map of FIG. 8(A) will be used in determining whether to engage (turn ON) the lock-up clutch 11, and then continues to step 70.

If "NO" is determined in step 30, control continues to step 40, where it is determined whether the drive source is the engine 1 and the motor generator 3. If "YES" is determined in step 40, control proceeds to step 110, determines that the map of FIG. 8(B) will be used in determining whether to engage (turn ON) the lock-up clutch 11, and then continues to step 70.

If "NO" is determined in step 40, control continues to step 50, where it is determined whether the drive source is just the motor generator 3. If "YES" is determined in step 50, control proceeds to step 120, determines that the map of FIG. 8(C) will be used in determining whether to engage (turn ON) the lock-up clutch 11, and then continues to step 70.

If "NO" is determined in step 50, since this is a case in which no drive source is operating, an engagement (ON) region of the lock-up clutch 11 will not be set, and control continues to step 70 without engaging (turning ON).

In step 70, it is determined whether the region is a region in which the lock-up clutch 11 is to be engaged (turned ON). This determination is made according to the map determined in step 100, step 110 or step 120.

If "YES" is determined in step 70, the lock-up clutch 11 is engaged (turned ON) in step 80, after which control continues to step 130 and RETURNs. In the case of a lock-up slip region, the lock-up clutch 11 is slip-controlled, after which control proceeds to step 130 and RETURNs.

Conversely, if "NO" is determined in step 70, the lock-up clutch 11 is disengaged (turned OFF) after which control continues to step 130 and RETURNs. When "NO" is determined in step 50 and control advances to step 70 via step 60, it is clear that "NO" will be determined in step 70 and that the lock-up clutch will be disengaged (turned OFF) in step 90 as described above, after which control will RETURN.

Since the map of FIG. 8(A) is used when driving is done by the engine 1, it is the same as in the case when driving is done by only a conventional engine. In contrast, in the map of FIG. 8(B), the region at which the lock-up clutch 11 is engaged (turned ON) is broader at low vehicle speeds than in the map of FIG. 8(A). This is due to the fact that the torque vibration generated by the engine 1 is reduced by the addition of driving torque from the motor generator 3. In the map of FIG. 8(C), the region at which the lock-up clutch 11 is engaged (turned ON) is even broader at low vehicle speeds than in the map of FIG. 8(B). This is due to the fact that, since driving is performed only by the motor generator 3, there is none of the torque vibration that is generated by the engine.

According to the above-described control, the region at which the lock-up clutch 11 is engaged (turned ON) when at least the motor generator 3 is operating as a drive source is broadened compared to when only the engine 1 operates as the drive source. The transmission and efficiency of fuel consumption also improves.

Figure 9:
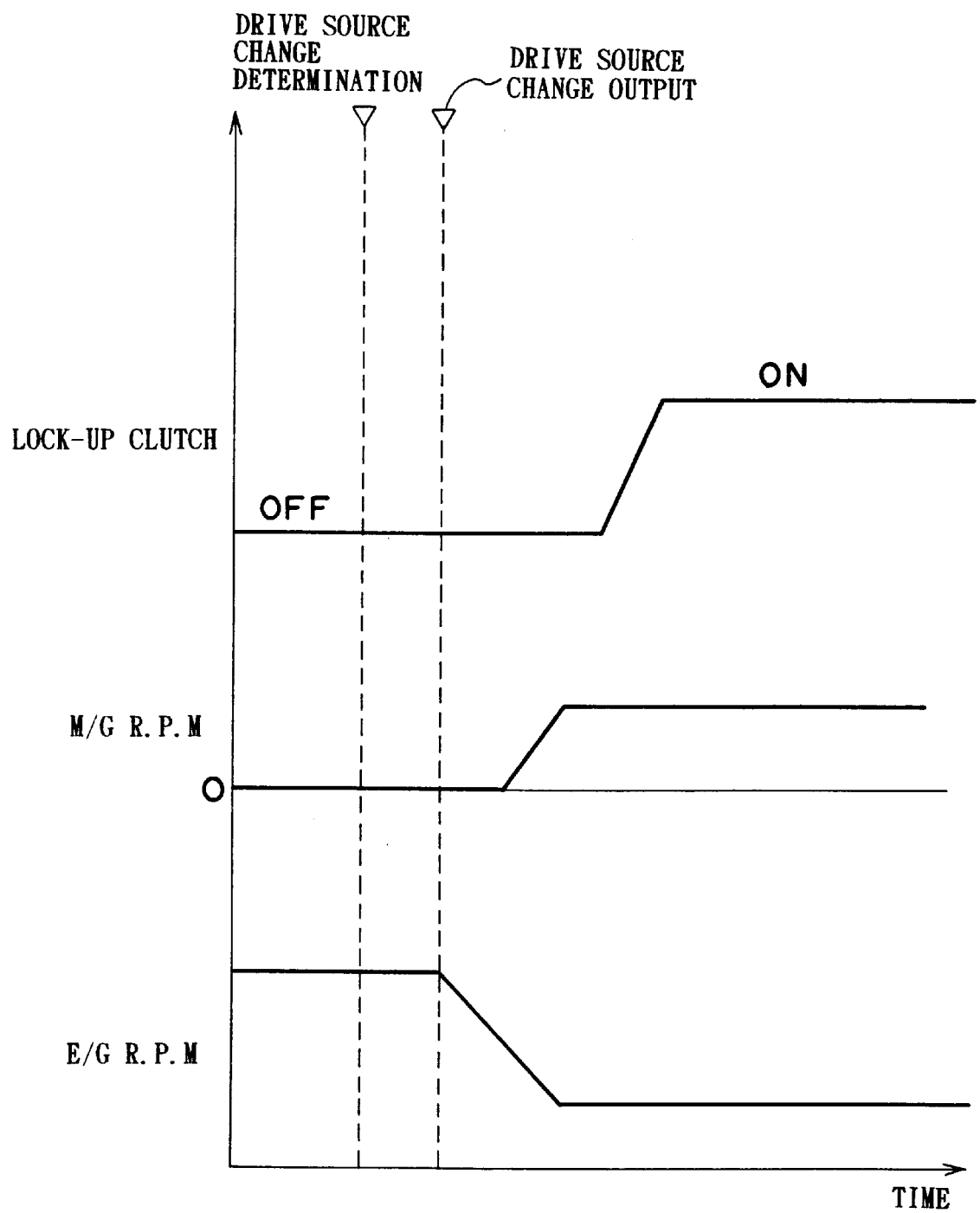
FIG. 9 is a timing chart that describes the control of FIG. 1.

FIG. 9 is a timing chart that shows the switching of the drive source from the engine 1 to the motor generator 3, the entering of the lock-up clutch 11 into the engaged (ON) region, and the operation when the lock-up clutch 11 is in the engaged (ON) state.

Figure 10:
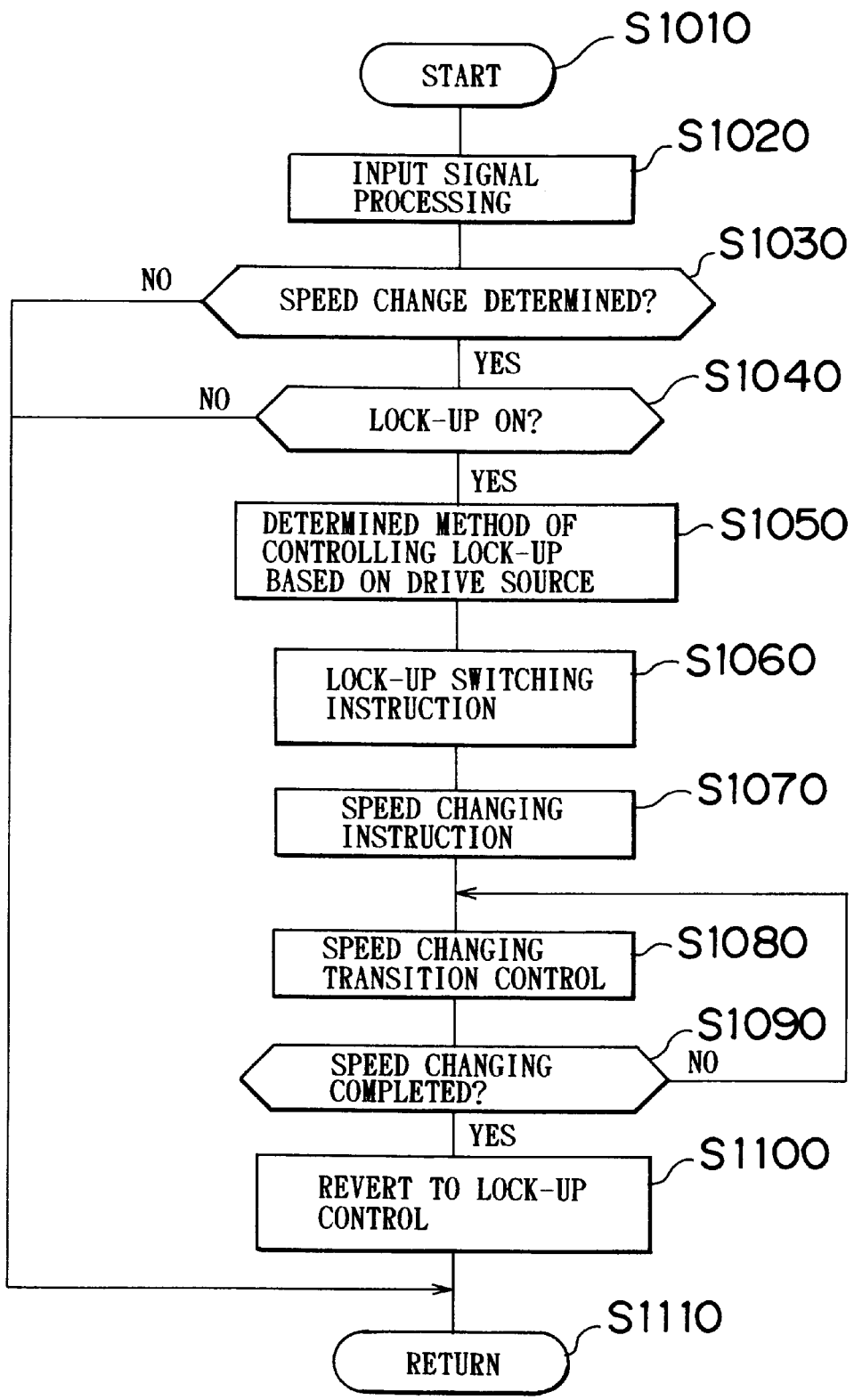
FIG. 10 is a flowchart that shows control of a second embodiment of the invention.

Next, control in a second embodiment, corresponding to claims 11 and 12, will be described with reference to FIG. 10. This control is a control example of a case in which, prior to performing speed changing through the transmission while running with the lock-up clutch engaged, when the motor generator 3 is being used as a drive source, the lock-up clutch 11 is placed in a half-engaged state, and when the engine 1 is being used as the drive source, the lock-up clutch 11 is fully disengaged, and then the vehicle is driven with the lock-up clutch 11 engaged once again.

First, in step 1020, input processing of various detected signals is performed, and in step 1030 it is determined whether a speed change has been determined. This determination is basically implemented through the vehicle speed and acceleration.

If "YES" is determined in step 1030, control continues to step 1040 and determines whether the lock-up clutch 11 is currently engaged (ON).

If "NO" is determined in step 1030, control jumps to step 1110 without doing anything further and RETURNs.

If "YES" is determined in step 1040, control continues to step 1050 and determines the method of controlling the lock-up clutch at the time of speed changing, based on the drive source type. In other words, when driving by the engine 1 (including the case of driving by both the engine 1 and the motor generator 3), speed changing is performed with the lock-up clutch 11 completely disengaged. When driving by the motor generator 3, speed changing is performed with the lock-up clutch 11 in the half-engaged state. Performing speed changing with the lock-up clutch 11 in the half-engaged state when driving by the motor generator 3 is done because control is easy since there is substantially no change in the torque generated by the motor generator.

If "NO" is determined in step 1040, control jumps to step 1110 and RETURNs without doing anything further.

In step 1060 the lock-up clutch 11 is placed in a half-engaged state or a wholly disengaged state in accordance with the determination made in step 1050. Specifically, a solenoid(s) (not shown) within the hydraulic pressure control device 39 for controlling the lock-up clutch is switched.

Next, in step 1070, speed changing is performed. Specifically, the appropriate shift solenoid (S) within the hydraulic control system 39 is switched.

Next, in step 1080, in accordance with the drive source, speed changing transition control, in other words, control of clutch or brake engagement within the automatic transmission, is performed. This is performed, for example, by performing feedback control of the r.p.m. on the transmission side, as is well known.

Once it has been confirmed in step 1090 that speed changing has been completed, control continues to step 1100, controls lock-up so as to result in the engagement state determined with respect to the driving condition, and then continues to step 1110 and RETURNs.

Figure 11:
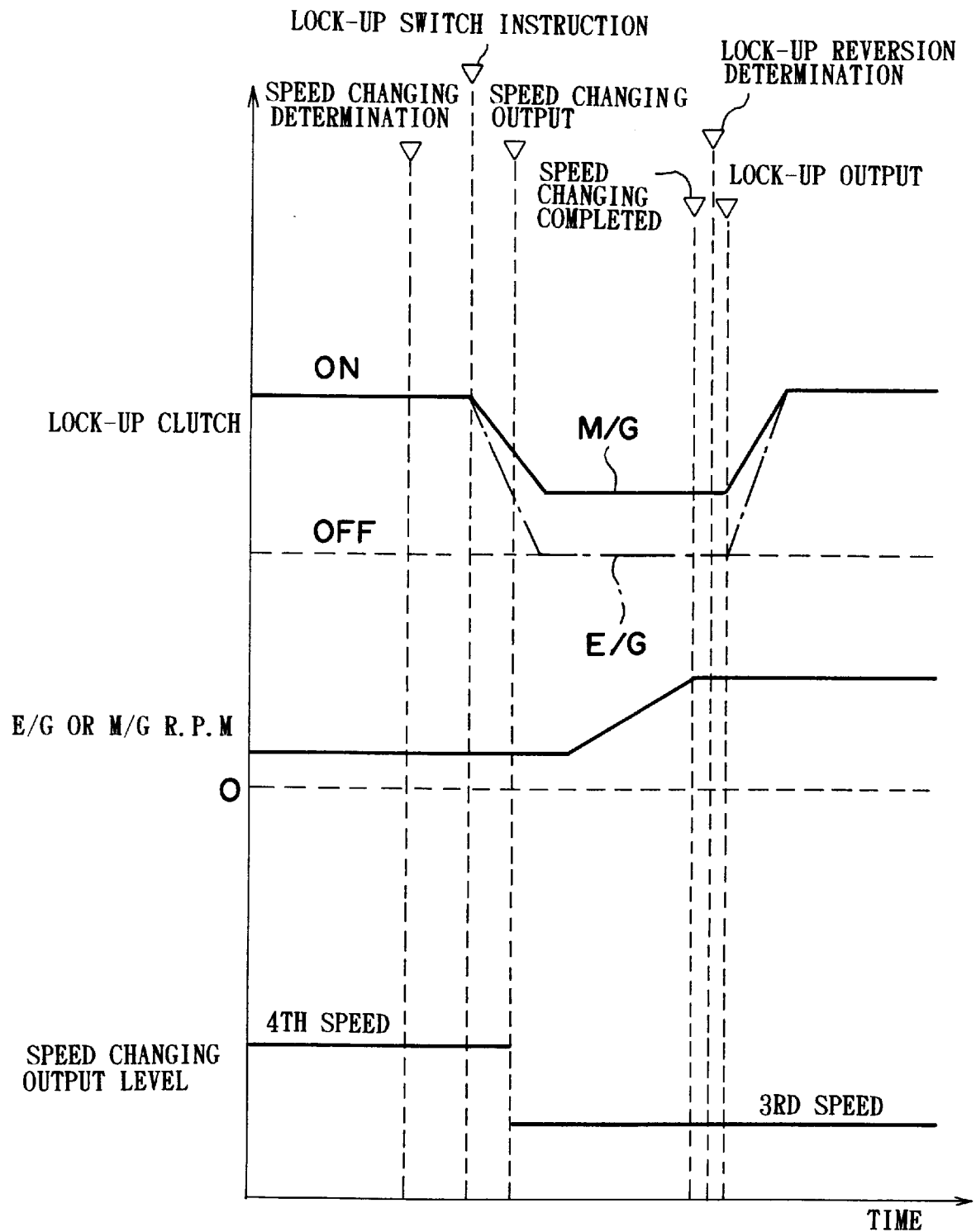
FIG. 11 is a timing chart that describes the control of FIG. 10.

FIG. 11 is a timing chart for explaining the changes that occur when downshifting from the fourth speed level with the lock-up clutch ON to the third speed level with the lock-up clutch ON.

The points are shown where, when changing speed while driving by the motor generator 3, speed changing is performed with the lock-up clutch 11 in the half-engaged state, and where, when changing speed while driving by the engine 1, speed changing is performed with the lock-up clutch 11 in a disengaged state.

Figure 12:
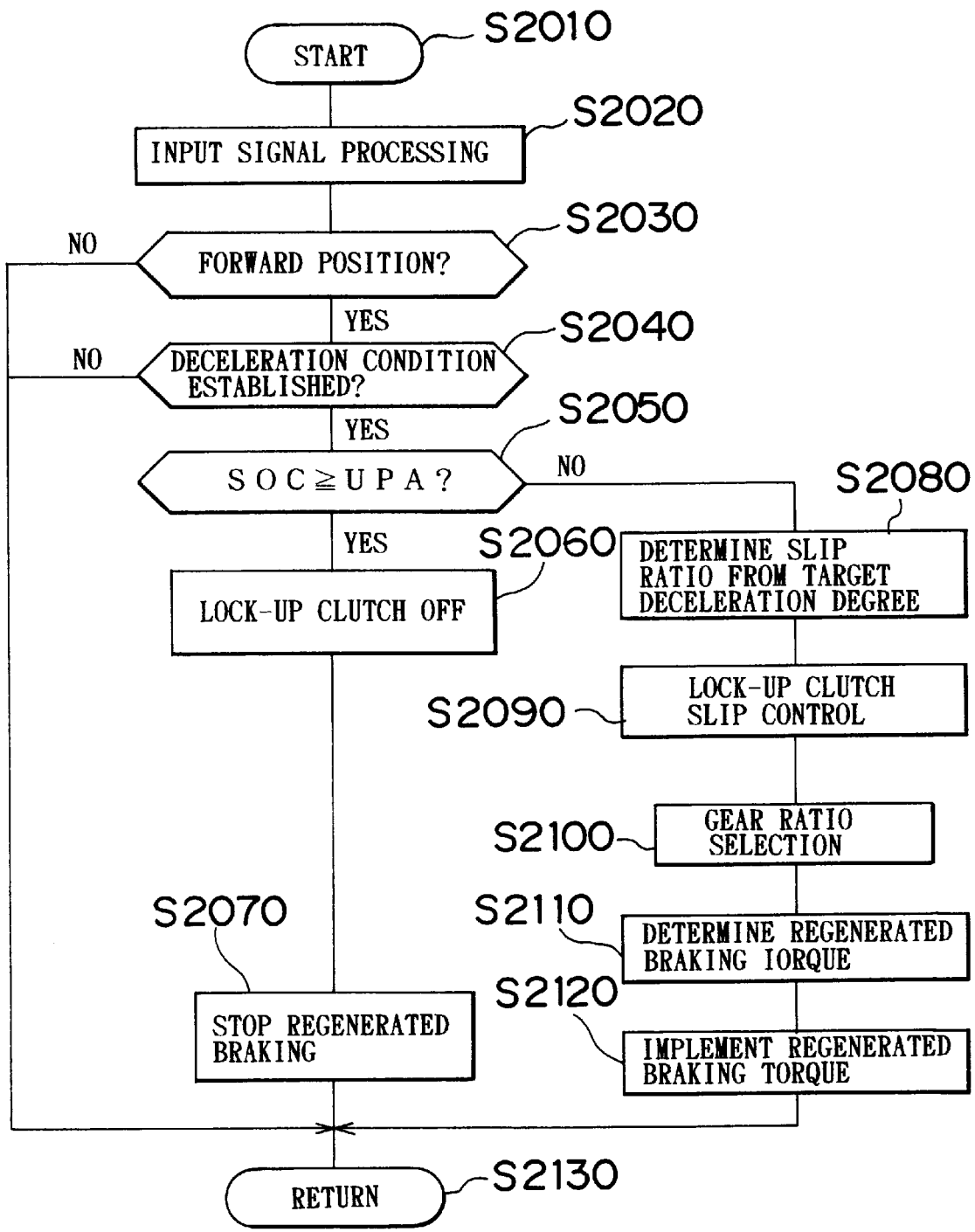
FIG. 12 is a flowchart of control in a 3rd embodiment of the invention.

Next, control in a third embodiment. corresponding to claim 6. is described with reference to the flowchart of FIG. 12. This control performs engagement control of the lock-up clutch 11 and adjusts a deceleration degree during deceleration of the vehicle.

First, in step 2020, input processing of various detected signals is performed. Next, in step 2030, it is determined whether the shift lever 4C is in a forward position, i.e., the D position, the 4 position, the 3 position, the 2 position or the L position. This determination is made because control of a deceleration degree of the motor generator 3 will only be performed when the vehicle is moving forward.

If "YES" is determined in step 2030, control continues to step 2040, where it is determined whether a deceleration condition has been established. If "NO" is determined in step 2030, control jumps to step 2130 and RETURNs without doing anything further.

If "YES" is determined in step 2040, control continues to step 2050, where it is determined whether the state of charge SOC of the battery 41 is greater than or equal to a specified value UPA. When the SOC is greater than or equal to the specified value UPA, this indicates that the battery 41 is near a fully-charged state.

If "NO" is determined in step 2040, control jumps to step 2130 and RETURNs without doing anything further. If "YES" is determined in step 2050, since the battery 41 is the state of charge of the battery is enough, control continues to step 2060, disengages the lock-up clutch 11, stops regenerative braking in step 2070, and then continues to step 2130 and RETURNs.

Figure 13:
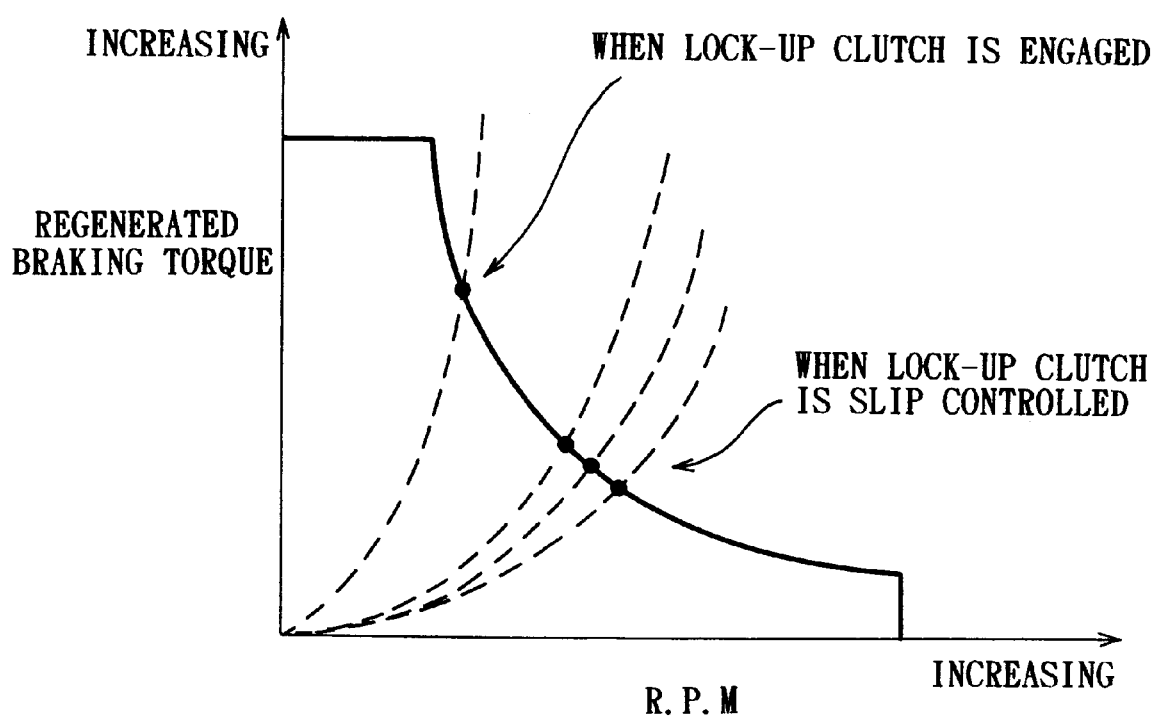
FIG. 13 is a diagram that shows the relationship between the engagement degree of the lock-up clutch and the regenerative braking torque.

On the other hand, if "NO" is determined in step 2050, control proceeds to step 2080 and determines a slip ratio of the lock-up clutch 11 and an optimum gear level from a target deceleration speed. The slip ratio of the lock-up clutch 11 is determined based on a map such as is shown in FIG. 13. Additionally, a gear level is selected at which the most desirable torque is output.

In step 2090, the lock-up clutch 11 is controlled at the control value determined in step 2080, and in step 2100 the gear transmission device 4 is shifted to the gear level determined in step 2080, if necessary. In step 2110, a regenerative braking torque is determined for the respective gear ratio. In step 2120, regenerative braking is implemented, after which control continues to step 2130 and RETURNs.

Figure 14:
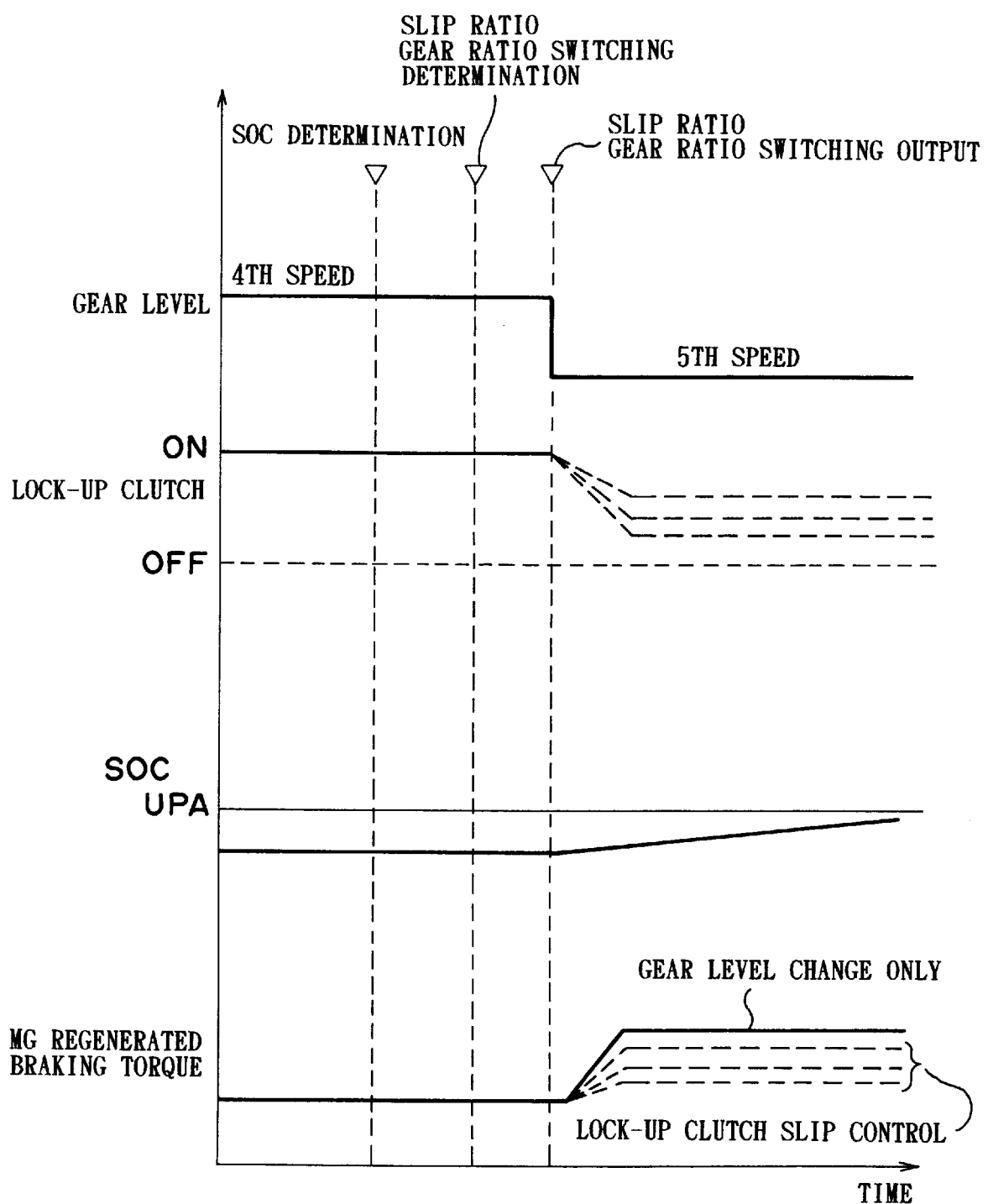
FIG. 14 is a timing chart that describes the control of FIG. 12.

FIG. 14 is a timing chart that describes the above-described control.

Here, the method of determining the regenerative braking torque in step 2110 of the above-described control will be described. The basic idea is that a constant amount of regenerative braking torque is applied by the motor generator 3 so that a continually uniform deceleration force is applied at each gear level, regardless of whether or not, or how much, the foot brake is depressed. Additionally, when the engine 1 is operating, regenerative braking is performed in the form of applying engine braking force.

Figure 15:
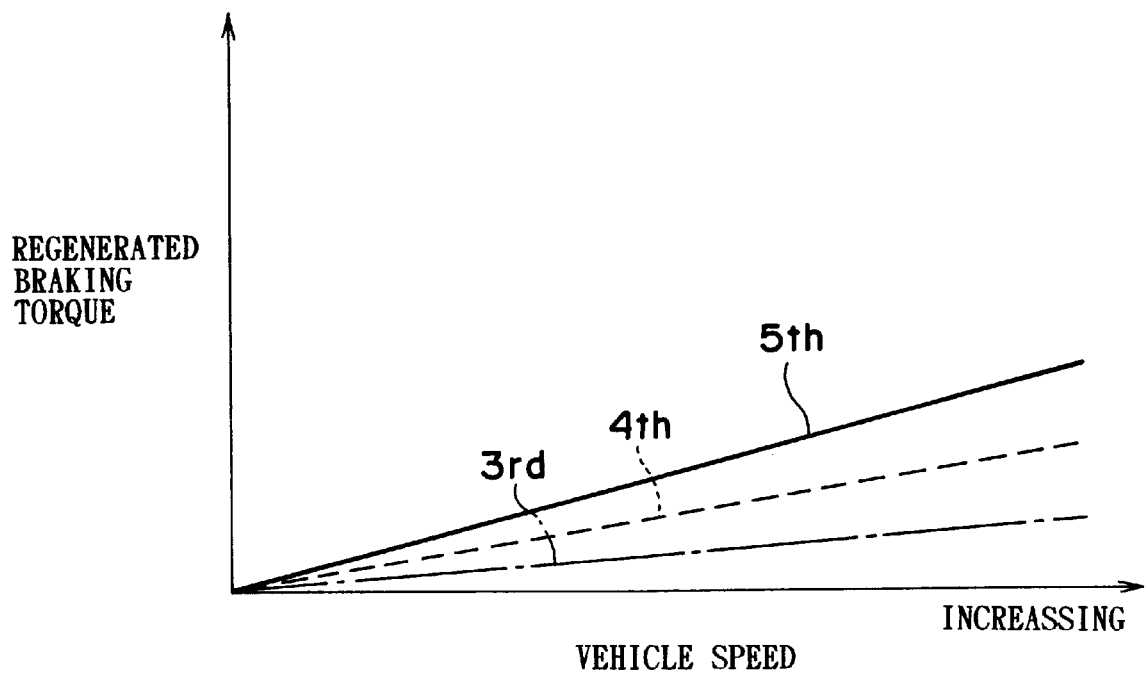
FIG. 15 is a diagram that shows the variation of regenerative braking torque with respect to vehicle speed, for different gear levels.

For example, in the case of a gear train such as is shown in FIG. 3, although it also depends on a gear ratio of differential gear, the engine braking force is insufficient at the fifth speed, the fourth speed and the third speed. Therefore, at the fifth speed, fourth speed and third speed, regenerative braking of the motor generator 3 is implemented in the form of adding force to the engine braking force. Regenerative braking of the motor generator 3 is not implemented at the second speed and below. FIG. 15 is a chart that shows the regenerative braking torque of the motor generator with respect to the vehicle speed. The higher the gear level, the higher the regenerative braking torque.

W5th>>W4th>W3rd

When the vehicle is running with the engine 1 stopped, since a controlling force is obtained by the rotation of the motor generator 3, regenerative braking by the motor generator 3 is also carried out at the second speed and below. Here, the case will be described in which engine 1 is operating and engine braking is occurring.

The automatic transmission in this embodiment can select a sports mode in addition to a normal mode.

Figure 16:
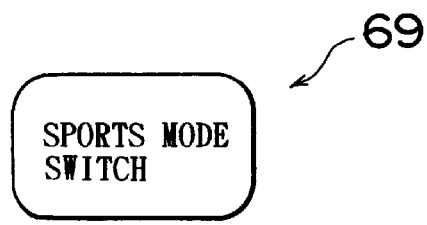
FIG. 16 is a diagram that shows a sports mode switch for selecting a sports mode.

FIG. 16 shows a sports mode switch 69 for selecting this sports mode. The sports mode switch 69 is arranged in a location at which it can be easily operated by the driver, and, for example, is structured so as to be ON when it is pushed in.

Figure 17A:
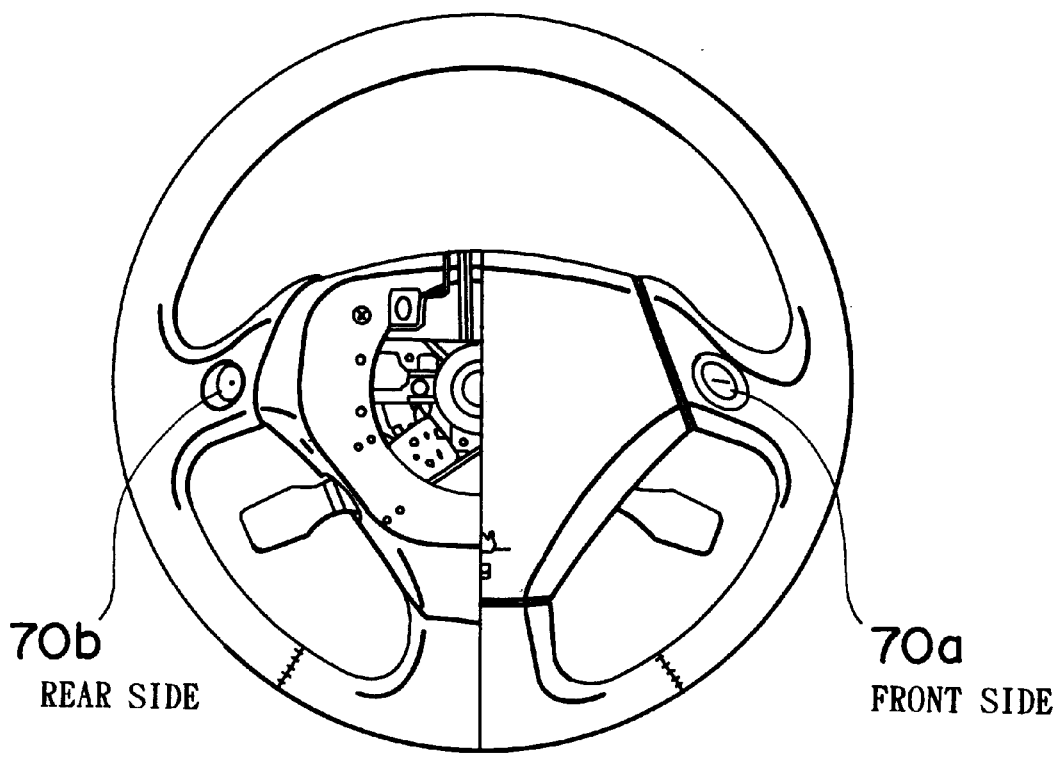
FIG. 17(A) is a diagram that shows switches that are provided on a steering wheel for performing downshift and upshift when the sports mode is selected.
Figure 17B:
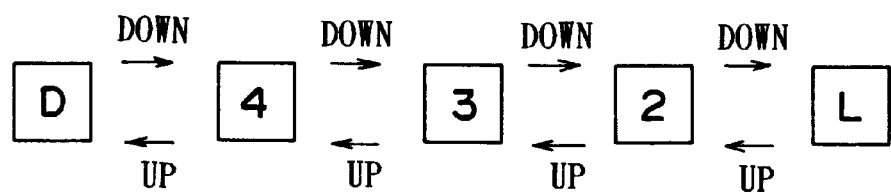
FIG. 17(B) is a diagram that shows shift positions switched by the switches of FIG. 17(A).

Meanwhile, as shown in FIG. 17(A) a downshift switch 70*a* for downshifting and an upshift switch 70*b* for upshifting are provided. Each of these switches is provided on the front and back of the steering wheel and can be operated by one hand. By operating the downshift switch and the upshift switch when the sports mode switch 69 is in an ON state, as shown in FIG. 17(B), level-by-level switching from D to L can be performed, and "sporty" driving is possible that approximates a manual transmission. The gear levels that are possible to use in each range are as follows.

D range: 1st, 2nd, 3rd, 4th, 5th 4 range: 1st, 2nd, 3rd, 4th 3 range: 1st, 2nd, 3rd 2 range: 1st, 2nd L range: 1st When the sports mode switch 69 is turned ON and the sports mode is selected, the above-described rotary amounts W are augmented as follows, for example.

W5th×1.3

W4th×1.2

W3rd×1.1

The driver expects a larger control force than in the normal mode. This expectation can be met by, as described above, when the sports mode is selected, using a higher rotary torque than in the normal mode.

Figure 18:
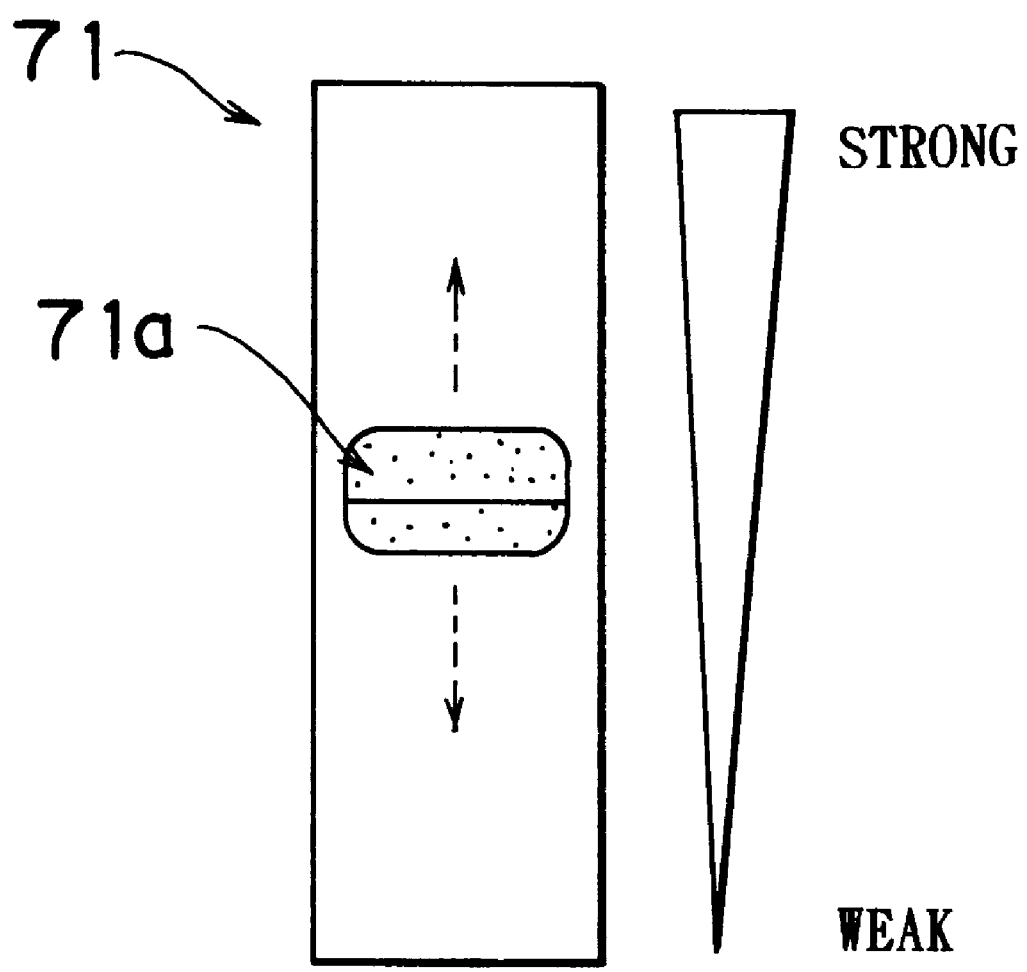
FIG. 18 is a diagram that shows a deceleration setting switch.

A deceleration setting switch 71 can be provided as shown in FIG. 18, which can be used to set the regenerative braking torque at a value desired by the driver. The deceleration setting switch 71 changes the regenerative braking torque by moving the knob 71*a*. Below, A is a value that is variable by the setting value of the deceleration setting switch 71 as described above.

W5th×1.3×A

W4th×1.2×A

W3rd×1.1×A

Additionally, a commonly known so-called AI-SHIFT function is provided, and when a downgrade can be, and is, detected, the rotary amounts W become as follows.

W5th×1.5

W4th×1.3

W3rd×1.2

Here, in a downgrade condition, too, only the 5th speed gear level is used. As shown below, if downshifting is avoided by changing the setting value B of the deceleration setting switch 71, the shock of downshifting can be prevented and drivability can be improved.

W5th×1.5×B

The sports mode switch 69, the downshift switch 70*a*, the upshift switch 70*b*, and the deceleration setting switch 71 are shown in dashed lines in FIG. 7, and their signals are input to the ECU 58. Additionally, when the sports mode is selected, a signal is sent from the ECU 58 to a sports mode indicator 85, shown in FIG. 7, which displays the fact that the sports mode has been selected.

Above, in the third embodiment, an example was given in which the regenerative braking torque is changed by changing the slip ratio of the lock-up clutch 11, and the deceleration of the vehicle is adjusted to a desired deceleration. However, it is also possible to change the regenerative braking torque in the same way by changing the angle of the stator to change the capacitance coefficient of the torque converter, without using the lock-up clutch 11, thereby performing adjustment of the vehicle deceleration.

According to the invention of claims 1–10, a vehicle uses an engine that operates through fuel combustion and a motor as drive sources, and is provided with torque transmission means with a lock-up clutch arranged between a drive wheel(s) on one side and the engine and motor on the other side. The content of engagement control of the lock-up clutch can be changed according to an operational state of the drive source, and can be made to be a lock-up clutch engagement state that is optimal for the operational state of the drive source.

In particular, in a structure according to claims 2 and 3, even in a case in which the lock-up clutch cannot be engaged from the standpoint of torque fluctuation when operating by the engine only, when the motor is operating as a drive source, the lock-up clutch can be engaged. The transmission efficiency improves in the case in which the motor is operating as a drive source, and consumption of battery power can be reduced.

In the invention of claims 11 and 12, a vehicle uses an engine that operates through fuel combustion and a motor as drive sources, and is provided with torque transmission means with a lock-up clutch arranged between a drive wheel(s) on one side and the engine and motor on the other side. The content of the lock-up clutch control can be changed according to an operational state of the drive source at the time of speed changing by the transmission. Therefore, speed changing can be carried out in an engagement state of the lock-up clutch that is optimal to the operational state of the drive source.

In particular, in a structure according to claim 5, when operating the motor as a drive source, speed changing can be carried out without completely disengaging the lock-up clutch. Therefore, transmission efficiency is improved.

In the invention according to claims 13 and 14, at the time of vehicle deceleration, the motor generator functions as an electrical generator, and the lock-up clutch engagement state is controlled in order to adjust the deceleration degree at the time of vehicle deceleration when regenerative braking torque is applied to the vehicle wheel(s) by the motor generator. Therefore, the width of adjustment of the vehicle deceleration is large.

What is claimed is:

1. A vehicle lock-up clutch control system that controls transmission of drive force between drive wheels on one side and an engine that operates by fuel combustion and a motor on the other side, for a vehicle that uses the engine and the motor as drive sources, the lock-up clutch control system comprising:

a torque transmission device with a lock-up clutch that is arranged between the drive wheels on one side and the engine and motor on the other side; and a lock-up clutch controller that controls an engagement state of the lock-up clutch;

wherein the lock-up controller changes content of the lock-up clutch engagement control according to an operational state of the drive sources.

2. The vehicle lock-up clutch control system of claim 1, wherein, in an operational state in which the motor is operating as a drive source, a driving region in which the lock-up clutch is engaged is broader than in an operational state in which only the engine is operating.

3. The vehicle lock-up clutch control system of claim 2, wherein, in an operational state in which only the motor is operating as a drive source, the driving region at which the lock-up clutch is engaged is broader than in an operational state in which the engine and motor both operate as drive sources.

4. The vehicle lock-up clutch control system of claim 2, further comprising:

a driving region determination device that determines whether a driving state of the vehicle is at a driving region at which the lock-up clutch is engaged;

wherein, when the driving region determination device determines that the driving state of the vehicle is at a driving region at which the lock-up clutch is engaged, the lock-up clutch is placed in an engaged state.

5. The vehicle lock-up clutch control system of claim 4, wherein the driving region at which the lock-up clutch is engaged is a region that is set according to a relationship between a vehicle speed and an acceleration degree.

6. The vehicle lock-up clutch control system of claim 1, wherein, in an operational state in which only the motor is operating as a drive source, a driving region at which the lock-up clutch is engaged is broader than in an operational state in which both the engine and motor are operating as drive sources.

7. The vehicle lock-up clutch control system of claim 6, further comprising:

a driving region determination device that determines whether a vehicle driving state is at a driving region at which the lock-up clutch is engaged;

wherein, when the driving region determination device determines that the driving state of the vehicle is at a driving region at which the lock-up clutch is engaged, the lock-up clutch is placed in an engaged state.

8. The vehicle lock-up clutch control system of claim 7, wherein the driving region at which the lock-up clutch is engaged is a region that is set according to a relationship between a vehicle speed and an acceleration degree.

9. The vehicle lock-up clutch control system of claim 1, further comprising:

a driving region determination device that determines whether a vehicle driving state is at a driving region at which the lock-up clutch is engaged;

wherein, when the driving region determination device determines that the driving state of the vehicle is at a driving region at which the lock-up clutch is engaged, the lock-up clutch is placed in an engaged state.

10. The vehicle lock-up clutch control system of claim 9, wherein the driving region at which the lock-up clutch is engaged is a region that is set according to a vehicle speed and an acceleration degree.

11. A vehicle lock-up clutch control system that controls transmission of drive force between drive wheels on one side and an engine that operates by fuel combustion and a motor on the other side, for a vehicle that uses the engine and the motor as drive sources, the lock-up clutch control system comprising:

a transmission provided between the driving wheels on one side and the engine and motor on the other side;

a torque transmission with a lock-up clutch provided between the driving wheels on one side and the engine and motor on the other side; and a lock-up clutch controller that controls an engagement state of the lock-up clutch;

wherein the lock-up clutch controller changes content of the lock-up clutch engagement control according to an operational state of the drive sources at the time of speed changing by the transmission.

12. The vehicle lock-up clutch control system of claim 11, wherein the lock-up clutch controller controls the lock-up clutch to be placed in a half-engaged state when the motor is operating as a drive source at the time of speed changing by the transmission, and controls the lock-up clutch to be placed in a disengaged state in an operational state in which only the engine is operating as a drive source at the time of speed changing.

13. A vehicle lock-up clutch control system in which at least a motor generator is provided as a drive source, the lock-up clutch control system controlling transmission of drive force between drive wheels and the motor generator, the lock-up clutch control system comprising:

a torque transmission with a lock-up clutch that is arranged between the drive wheels and the motor generator, whereby it is possible to apply a regenerative braking torque to the drive wheels by causing the motor generator to function as an electrical generator; and a lock-up clutch controller that controls an operational state of the lock-up clutch;

wherein the motor generator is caused to function as an electrical generator during deceleration of the vehicle; and wherein the lock-up clutch controller controls an engagement state of the lock-up clutch in order to adjust a deceleration degree during deceleration of the vehicle.

14. The vehicle lock-up clutch control system of claim 13, wherein the lock-up clutch controller changes a regenerative braking torque by changing a slip ratio of the lock-up clutch, thereby adjusting the vehicle deceleration.

* * * * *